United States Patent
Horgan (10) Patent No.: US 7,363,265 B2
(45) Date of Patent: Apr. 22, 2008

(54) METHOD AND SYSTEM FOR UBIQUITOUS ENABLEMENT OF ELECTRONIC CURRENCY

(75) Inventor: Michael J. Horgan, Sacramento, CA (US)

(73) Assignee: Innovative Payment Systems, LLC, Sacramento, CA (US)

( * ) Notice: Subject to any disclaimer, the term of this patent is extended or adjusted under 35 U.S.C. 154(b) by 1497 days.

(21) Appl. No.: 09/839,745

(22) Filed: Apr. 19, 2001

(65) Prior Publication Data

US 2002/0022966 A1 Feb. 21, 2002

Related U.S. Application Data

(60) Provisional application No. 60/199,019, filed on Apr. 20, 2000.

(51) Int. Cl.
*G06Q 40/00* (2006.01)
(52) U.S. Cl. .................... 705/35; 705/40; 235/380
(58) Field of Classification Search ............... 705/35, 705/45
See application file for complete search history.

(56) References Cited

U.S. PATENT DOCUMENTS

| | | | |
|---|---|---|---|
| 5,477,038 A | * | 12/1995 | Levine et al. ............. 235/380 |
| 5,663,546 A | | 9/1997 | Cucinotta et al. |
| 5,777,305 A | | 7/1998 | Smith et al. |
| 5,920,847 A | * | 7/1999 | Kolling et al. ............. 705/40 |
| 6,581,041 B1 | * | 6/2003 | Canney ................... 705/36 R |

FOREIGN PATENT DOCUMENTS

| | | |
|---|---|---|
| EP | 666549 | 2/1995 |
| GB | 2305393 | 8/1995 |
| GB | 2338814 | 6/1998 |
| WO | WO 95/12169 | 10/1994 |
| WO | WO 96/38801 | 6/1996 |

* cited by examiner

*Primary Examiner*—James A. Kramer
*Assistant Examiner*—Jocelyn W. Greimel
(74) *Attorney, Agent, or Firm*—John P. O'Banion (57) ABSTRACT

A process for facilitating payment card transactions from an underlying virtual account that exists as a data entity within a trust account, wherein cardholders are able to purchase goods and services from a merchant. The cardholder may execute a transaction at any venue which presently accepts a debit card for payment. The funds of the trust account need not be linked to a checking account or credit account, wherein the liability of the cardholder, card issuer, and merchant can be reduced. Preferably, the virtual account is initially established when the card is issued and activated, and can be depleted through one or more transactions for which the card is used as the means of payment, or monetary transfer, and may be recharged from time-to-time by depositing additional funds into the virtual cardholder account or crediting the balance of the virtual account as the result of a merchant refund, adjustment, or transfer from another cardholder.

30 Claims, 4 Drawing Sheets

METHOD AND SYSTEM FOR UBIQUITOUS ENABLEMENT OF ELECTRONIC CURRENCY

CROSS-REFERENCE TO RELATED APPLICATIONS

This application claims priority from U.S. provisional application Ser. No. 60/199,019 filed on Apr. 20, 2000, incorporated herein by reference.

STATEMENT REGARDING FEDERALLY SPONSORED RESEARCH OR DEVELOPMENT

Not Applicable

REFERENCE TO A MICROFICHE APPENDIX

Not Applicable

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office file or records, but otherwise reserves all copyright rights whatsoever.

BACKGROUND OF THE INVENTION

1. Field of the Invention

This invention relates generally to transaction payment systems and methods and, more particularly, to a rechargeable value payment card linked to a trust account containing one or more agglomerated virtual accounts, that may be processed by merchants in a similar manner as a conventional debit card.

2. Description of the Background Art

A number of financial instruments have been developed that allow parties to transact business, such as purchasing goods and services, bill payment, and the transfer of funds between parties without a requisite need to carry significant amounts of cash. Historically, the bank draft was one of the original payment instruments that enabled individuals to offer a merchant, or related party, a document which authorized the bank on which it was drawn to deliver to the payee those funds specified on the face of the instrument, which were in turn removed from the account of the payer. The transaction process between the payer and the payee, such as customer and merchant, being mediated by the bank. The practice of utilizing these drafts evolved and the creation of formalized payment "documents" arose which contained standardized placement of selected transaction information, such as the date, payee name, transaction amount in both numeric and scribed forms, and information describing the payer account (such as an account number), along with the signature of the payer. The aforementioned payment instruments became commonly referred to as "checks".

One advantage of a formalized payment instrument, as opposed to a handshake, or verbal transaction, was that it facilitated a standardized and equitable transaction under a large number of circumstances. A common event encountered with the use of checks is that of the payer having insufficient funds in the account upon which the check is drawn, the condition being referred to as "non-sufficient funds", or "NSF". The bank must either reject the transaction and return the check to the depositor, or may alternatively extend credit to the payer in an amount sufficient to cover the deficiency, whereupon funds may be disbursed to the payee in the amount of the check.

The service of providing a credit extension is typically charged to the payer in the form of transaction fees and finance charges on remaining credit balances. The extension of credit by financial institutions has evolved into various products within an enormous credit industry. The practice of extending credit to depositors in the amount of the purchase, to be repaid over a period of time, became known as revolving credit and led to the introduction of various charge cards and credit cards. It will be appreciated that charge cards and credit cards are both a form of payment card that enables the customer of a financial institution to make a series of purchases as a cardholder from one or more merchants or service providers. A cardholder using a charge card or credit card is expected to remit payment for the purchased goods and services in response to a time deferred billing. Often a credit card allows the cardholder to pay only a portion of the principle and carry-over a debt balance from one month to the next, so long as a specified minimum payment is remitted and the debt does not exceed the credit limit for the account. It will be appreciated that the total expenditures for purchases made with the payment card are applied to a credit, or charge account, thereby increasing the financial obligation of the cardholder to the issuing bank. In contrast, the expenditure for each purchase for which a check is tendered as payment is directly extracted from the purchaser's checking account when the associated check clears the bank. When the debt of a credit card balance is carried forward, the cardholder is financially obligated to make payments to the issuing bank according to the interest and minimum payment terms of the cardholder contract until the debt has been fully paid. The terms and conditions upon which such a line of credit is issued typically include a specified amount of credit to be extended, a specified term over which the balance will be repaid, an interest rate, a compounding method, and a minimum periodic payment of principal and interest. Credit card usage provides a convenience for the purchaser while providing a lucrative source of revenues for the issuing institution. Studies have found that consumers spend more freely with charge card purchases wherein merchants that accept credit cards are more able to reach profitable sales volumes. It will be appreciated that the proceeds from charge card interest payments can account for up to about seventy five percent (75%) of total profits for associated financial institutions. At present, the ten largest institutional credit card issuing banks receive approximately twenty five billion dollars ($25×10^9$) in profits annually from credit card interest. In addition, other charge card related fees and charges can further increase profitability, such as annual fees for issuing the credit cards, late fees, transfer fees, over-the-limit fees, and assorted other miscellaneous charges. In addition to the paying of accrued interest, cardholders are also subject to transaction fees for obtaining cash advances which may approach up to about four percent (4%) of the total transaction amount, and may additionally be subject to a higher interest rate than that which applies to purchases. These fees generally apply from the date of posting the advance, even if paid in full upon presentation of the statement. Furthermore, it should be appreciated that when a charge card is utilized for payment within a transaction, the merchant is also subject to fees levied on the transaction by the payment card issuer, and often the acquiring bank. Typically, these transaction fees comprise a fixed fee per transaction in addition to a predetermined percentage of the transaction amount, such as from between about one to five percent (1% to 5%), and subject to monthly minimums.

A variety of charge cards exist which are characterized by differences in the allowable use of the card and the procedures for charging fees. For example, charge cards such as American Express®, and Diners Club®, have no predefined credit limit, but require that the cardholder pay the outstanding balance upon presentation of the statement, with certain exceptions. Issuers of charge cards may also assess cardholder annual fees, for instance up to one hundred dollars ($100) or more. Large retail merchants, such as department stores and gasoline companies, often issue "in house" credit cards to encourage patronage at that particular merchant establishment, or an associated group of merchants. In addition, various charge cards differ in the methods and amounts by which merchants are charged transaction related fees.

The operation of a traditional payment card-processing environment involves the payment of fees by both transaction parties, although these fees are generally assessed in different ways. Each transaction party, for instance purchaser and merchant, is represented by a financial institution such as a bank, savings and loan, credit union, charge card vendor, or other form of financially capable institution. The cardholder is associated with the issuing bank, or institution, and the merchant is associated with the acquiring bank, or institution. The merchant is hereby defined as any entity, other than the issuing bank, or institution, which accepts a form of payment card.

Alternatives to charge cards have been created which reduce the overall risk of theft and fraud in specific situations. Perhaps the best examples of these alternative are stored value cards and debit cards. Stored value cards are exemplified by gift cards and prepaid cards which are purchased from specific merchants and service companies. Debit cards are utilized for the purchasing of good and services in a physically similar manner to a charge card or credit card, however, charges for the purchases are automatically deducted from an associated checking account.

It will be appreciated that debit cards are not subject to periodic billing statements and accumulated finance charges because funds are directly withdrawn from an underlying cardholder account, specifically a checking account. Prior to obtaining a debit card, therefore, the prospective cardholder must establish a checking account and deposit monies to establish a checking account balance. The ability of an individual to qualify for a checking account at a bank is subject to certain regulations imposed by government and policies developed and enforced by the issuing bank. Terms for establishing a checking account typically include establishing a permanent residence address, submitting a form of government issued identification, and the submitting of a qualifying application with a minimum opening deposit. As a result of these qualification issues, many individuals are unable to qualify for a checking account and, therefore, are unable to obtain an associated debit card.

In addition to providing checking accounts and debit cards, financial institutions often offer credit extension services, such as the issuing of charge cards and the establishment of checking account overdraft protection. However, it will be appreciated that additional qualification requirements must be met for these credit extension services, and individuals that do not qualify for a checking account will generally not qualify for these services.

A number of persons who technically qualify for a checking account may lack either the ability or the discipline to maintain accurate transaction records or modulate spending in accord with their available funds, leading therefore to overdrafts and the concomitant fees and eventual rejection of the transaction for non-sufficient funds (NSF). Prospective cardholders may also lack acceptable identification or access to the bank itself for the posting of covering deposits. In addition, the checkbook of an individual may be stolen and the checks contained therein illegally tendered to access the account of the individual for executing a fraudulent purchase transaction. Depending on the bank and the circumstances, the individual is typically reimbursed fully or partially for the loses if they followed the stated bank procedures for card use and timely notification. Bank losses as a result of theft and fraud are becoming increasingly significant, and these costs are borne by the fees paid by the transaction parties executing valid transactions. In the modern era of computers, it has been demonstrated that the unscrupulous computer expert is capable of acquiring the necessary information regarding an individual's checking account such that they are able to access bank records, execute funds transfers, and write "electronic checks", such as those utilizing protocols according to the "automated clearing house" (ACH) protocols.

The debit card essentially combines access to a checking account with the electronic processing functions and the ease of use and acceptability of a credit card. The debit card is processed using the same equipment and general merchant procedures as those utilized in processing credit cards, and subject to the same levels of merchant acceptance. In contrast to a credit card, however, the loss or theft of a debit card, or the illegal use of the underlying information without consent or knowledge by the cardholder, is typically treated by the bank or institution in a manner different than an equivalent credit card. For example, the unauthorized use of a lost or stolen credit card typically subjects the cardholder to a maximum liability of fifty dollars ($50). However, the cardholder of a debit card which is subject to regulations under the federal Electronic Fund Transfer Act may have a legal liability which can greatly exceed fifty dollars ($50). Cardholders are often subject to a fifty dollar ($50) maximum liability if the thefts are reported within two business days. As a matter of policy, certain card issuers, for example VISA™ and MasterCard™ presently cap debit card liability at fifty dollars ($50) for unauthorized charges. Beyond the two day reporting period, but prior to sixty (60) days having elapsed after statement mailing, the liability increases to five hundred dollars ($500) excepting special circumstances such as extended travel or hospital stays. Moreover, the liability outside of these conditions may include the entire balance of the checking account, and may include losses associated with overdraft lines of credit. The failure to report any error in a statement within sixty (60) days of mailing relieves the bank of any obligation to investigate.

Issuing banks, or institutions, often charge monthly fees of up to approximately five dollars ($5.00) or a transaction fee of up to one dollar and fifty cents ($1.50) per debit card transaction, or a combination thereof. It will be readily appreciated that performing transactions with a debit card provides added financial benefits to the issuing bank in comparison with check transactions. The cost of processing a physical check exceeds that of processing a debit card, however, the charges levied on participants utilizing a debit card are typically in excess of those collected for utilizing checks. Debit card transactions are more difficult for a cardholder to record than a checking transaction, as a register and writing implement are necessary along with a separate action to record the transaction. Debit card transactions are thereby often not recorded in a timely manner, wherein the cardholder has a higher probability of entering an overdraft non-sufficient funds (NSF) situation for which additional penalty fees and percentages may be recovered by the bank. If the checking account is protected by overdraft protection, the NSF charges may be avoided, however, the cardholder is typically then subject to additional bank charges and interest.

A further alternative to a charge card, or debit card, is a stored value device such as a gift card. In recent years gift cards have partially supplanted gift certificates as a merchant redeemable value instrument. Gift cards are typically sold in various fixed denominations, for example twenty dollars ($20), fifty dollars ($50), or one hundred dollars ($100) by a merchant or service provider to a customer. The recipient of the gift card may use the gift card as full or partial payment to purchase goods and services with the merchant. One especially attractive advantage of the card format lies in its ability to retain partial value. When a traditional gift certificate is utilized to purchase items with a collective purchase price and applicable tax that is below the face value of certificate, the remaining certificate value is typically returned to the recipient in the form of cash. The merchant, therefore, does not fully benefit from the whole value of the certificate. A gift card utilizes a magnetic stripe, typically on the backside of the card, which contains encoded information linked to the value of the card. The value of the gift card may thereby be reduced by a transaction amount, such that the merchant is assured of expenditures by the individual which match or exceed the gift certificate. Although the implementation of a gift card is merchant dependent, the validity and value of a gift card are typically maintained within a database maintained by the particular issuing merchant. A primary limitation of gift cards is their inability to be utilized for making purchases with different non-related merchants. The gift card is limited to use with the merchant for which the card was purchased, because at the time of purchase a cash transaction was performed by the card purchaser in exchange for the denomination of the gift card by the particular merchant. Therefore, the payment for goods and services has already been made to the merchant and the gift card serves only as a token for tracking cumulative exchange of prepaid credit for goods. In recognition of this aspect of gift card use, taxing authorities typically recognize the taxable event for a gift card at the time the gift card is redeemed, instead of at the time of gift card purchase. It is generally accepted that depositing money, such as in a bank account, is not a taxable event in that no exchange has been made. During the time which elapses between gift card purchase and subsequent use, the monies are effectively retained by the merchant. Gift cards are not renewable and their related balance is thereby subject only to depletion as purchase transactions are executed. The gift card value declines with each purchase until a transaction occurs in which the balance reaches zero, at which time the card is typically retained by the merchant for subsequent destruction.

The use of prepaid cards is a further alternative to debit cards and gift cards. A prepaid card is a stored value device which is similar to the gift card, yet generally includes a value recharge capability. Prepaid cards are most often utilized by the purchasing individual, although this is not generally a limitation of the card itself, a prepaid telephone card is a common example. Similar to gift cards, prepaid cards are similarly constrained to redemption with the merchant, or vendor, associated with their purchase. For example, a prepaid telephone card is issued by a telephone carrier such as AT&T™, MCI™ or Sprint™, although it may be sold by an unrelated third party, usually referred to as an "agent". Prepaid telephone cards enable the calling party to place a long distance telephone call such that the cost of the call is deducted from the unused balance of the prepaid telephone card. The use of prepaid phone cards eliminates the drawbacks associated with depositing coins in a payphone, or the expense associated with utilizing an operator to place the call. Infrequent long distance callers have been able in many situations to discontinue long distance services that charge baseline service fees of from three dollars ($3) to seven dollars ($7) per month in deference to the use of a prepaid card. In addition, the card holder at the time of purchase, is intrinsically aware of the cost per minute as a result of the phone card being typically sold for a given number of calling minutes at a predetermined cost. The caller also is generally informed of the remaining balance on the card in units of calling minutes. The vendor of the prepaid telephone card gains an advantage by receiving up-front money for services rendered at some time in the future, if at all.

Prepaid cards are also commonly utilized for rendering services in association with public transportation such as "light rail". When utilized for prepaid transportation, the commuter may purchase a prepaid card with a predetermined value, such as twenty dollars, ($20), subsequent to which they may use commuter services between various points, at various times, while the card acceptance systems of the transportation authority calculate the cost for each element of the trip and concomitantly deduct that amount from the balance of the prepaid commuter card. It is common for prepaid cards, such as phone cards, to include a "refill" capability, wherein the remaining balance on the prepaid card may be incremented in response to money tendered.

A further example of a prepaid card can be found in the gaming industry to eliminate the necessity of the gambler to carry a large number of coins from one machine to another. The user of the these cards need never touch the physical coins and may transact all their gambling through the use of the card. Unlike coins, the gaming cards can be utilized with gaming machines of any denomination, for example allowing the gambler to move from a quarter slot machine to a dollar video poker machine without first exchanging quarters for dollars. The proprietary prepaid gaming cards are often given an initial value at the time of purchase, for example in exchange for a cash payment to the casino, a given sum being transferred from a credit or debit card, a transfer from a checking account via an ACH transaction, or from a line of credit extended by the casino to the customer. The gaming card can typically be utilized by the customer as they freely move from one area of the casino to another, "purchase" gaming chips, play electronic games of chance such as slot machines, or video poker, or make purchases in restaurants, shops, showrooms, and so forth using the proprietary prepaid card is if it were cash. Prepaid gaming cards provide the added benefit that winnings may be automatically applied to increment the card rather than requiring a collection of coins to be carried and redeemed. Once the cardholder finishes gaming, or otherwise completes the activities for which the proprietary prepaid card can be used, the balance may be paid in cash, or transferred to a line of credit account within the casino, a debit or credit card, or applied to a checking account for the individual via an ACH transfer. Furthermore, the casino cards provide a non-related benefit wherein the casinos are able to track the extent of an individuals gambling, whereas a concomitant level of perks, such as free nights, dinners, entertainments, and so forth may be awarded.

Electronic equivalents of all of the aforementioned forms of payment cards have been implemented or suggested, such as by the use of "smart cards", electronic wallets and so forth. It will be appreciated that the electronically enabled forms of payment cards are generally subject to similar usage processes and problems as their aforementioned plastic card counterparts. Smart cards typically utilize an electronic microchip to serve the twin purposes of encrypting the data stored on the smart card, and to modify that data as a function of card usage. By way of example, the balance recorded within the smart card is typically incremented or decremented in response to the transactions for which the card is used. It will be appreciated, however, that the use of smart card technology poses a number of serious problems. One problem is with the vulnerability of the data encrypted within the device. Smart card cryptographers have been able to use various attacks, such as those including differential power analysis, to theoretically break most known microprocessor cards without any knowledge of the underlying cryptographic algorithms. Applications, such as e-purse and electronic wallets, which rely on the physical security of smart cards, may be vulnerable to attack and the risk of attendant loss associated with fraud. Insiders within the smart card industry have breached every smart card chip to which they have turned their attention.

Account reconciliation and the maintenance of audit trails are not typically provided in connection with the use of smart card technology when deployed as disposable or rechargeable stored value cards. For example, the VISA Cash Card™ features both disposable cards loaded with predetermined values and a card which is capable of being recharged at specialized terminals and selected ATMs. The cash card device does not, however, provide the capacity for account reconciliation, nor does it provide an audit trail. The cardholder is thereby left performing these functions manually.

Stored value cards typically suffer from a lack of safeguards which are currently inherent within traditional payment card processing architectures. These missing safeguards are readily apparent in the areas of authentication, authorization and settlement. Authentication refers to the process of determining whether or not the card being presented is a bona fide card from the issuer by the bona fide cardholder. Authorization examines the availability of funds which exist for the execution of the transaction. Settlement describes the process by which the acquiring institution, representing the merchant, is paid the face value amount of the transaction by the issuing institution on behalf of the cardholder, less any processing fees such as a discount fee, which are orchestrated by the transaction processor upon the delivery of goods or services. The process is additionally subject to charge-backs, refunds, and credits. Charge-backs result when the issuing institution refuses the transaction, as a result of which a charge is posted to a merchant account which reverses the original transaction and is often subject to additional charge-back fees. Transaction refunds and credits occur when purchased merchandise is returned to the merchant by the cardholder for a refund, or a credit is offered to the cardholder by the merchant as a compromise. The aforementioned protection mechanisms are inherent within the traditional card processing infrastructure and protect both the merchant and the cardholder by reducing the risk of fraud. It should be appreciated that the current card processing infrastructure has enabled more than one hundred fifty seven million ($157 \times 10^6$) American cardholders within over eighty million ($80 \times 10^6$) households to utilize over one point five billion ($1.5 \times 10^9$) debit, credit, and charge cards through more than twelve thousand (12,000) financial institutions. The ACH infrastructure each year, for example, processes more than five billion ($5 \times 10^9$) transactions with a total value of more than sixteen trillion dollars ($\$16 \times 10^{12}$).

It will be appreciated, therefore, that consumers and merchants can benefit from the adoption of new systems and methods which provide ease of use while not requiring the existence of an underlying charge or checking account. The present invention satisfies those needs, as well as others, and overcomes the deficiencies of previously developed payment instruments to provide for the ubiquitous enablement of electronic currency through the existing payment architectures and infrastructure.

BRIEF SUMMARY OF THE INVENTION

The present invention provides a virtual account payment method and system that may be readily acquired and utilized within the existing payment card infrastructure with conventional equipment while reducing cardholder liability for unauthorized use. A financial institution may offer clients an effective, reduced risk, means of paying for merchandise and services with a payment card that is associated with a virtual account. The virtual account payment card utilized within the present invention enables an individual to transact business with reduced barriers-to-entry, reduced costs, fewer restrictions, greater ease-of-use, broad market acceptance, and significantly reduced liability as an alternative to conventional payment card systems such as debit cards, charge cards, credit cards, stored value gift cards, prepaid cards, and so forth. In addition, the present invention provides additional benefits relating to the secure transport, transfer, or communication of monetary value from one cardholder to another.

Payment cards, such as credit cards and debit cards, are processed according to two similar transaction processes. Acquisition processing is typically performed on credit card and charge card transactions, wherein the acquiring processor coordinates the various processes involved. A similar form of processing is required for debit card transactions, however, the funds are ultimately withdrawn from a checking account in similar manner to an electronic check transaction effected through the ACH infrastructure or an ATM transaction. Furthermore, two primary settlement protocols exist which are referred to as "On-Line" and "Off-Line" transactions. On-Line refers to the practice of settling the transaction individually, in real time or as close to real time is may be practicable, such as in the case of a debit card, which effectively operates as an enhanced ATM card requiring a personal identification number (PIN). The Off-Line payment card, however, is more readily accepted by merchants and is settled in a batch process, such as in the case of a credit or charge card transaction. It will be appreciated that a number of debit cards, such as VISA™, MasterCard™, CHECK CARD™, and MASTERMONEY CARD™, are generally accepted in a homologous manner as conventional credit cards. Generally, Off-Line transactions are consummated in the presence of the merchant with the inclusion of the signature of the cardholder. The preferred protocol for processing payments according to the present invention follows the typical processing methods associated with Off-Line debit card protocols transacted within the acquiring processor infrastructure. It should be appreciated, however, that the present invention may be utilized with any of a number of processing architectures or infrastructures, including On-Line transactions, ACH, and so forth.

Debit cards are coupled with an associated checking account maintained by the cardholder at an issuing institution. In a conventional transaction, the merchant accepts the debit card, or the associated information in the case of a phone or Internet transaction, and transmits pertinent information to the issuing institution. The card processor authenticates the card to determine if the debit card has been reported lost, stolen, or misused. Authorization of the debit card account by the card processor verifies the validity of the debit card account and the availability of funds with the issuing institution. In some cases, the authorization process may result in placing a hold on the checking account for the amount of the transaction, yet typically does not result in the immediate transfer of funds from the checking account. Authorization results in the card processor returning to the merchant either a rejection in the form of a "declined" message, or an acceptance which is indicated by an issuance of an authorization code. Subsequent to authorization, generally at the close of the business day, the merchant transmits a file referred to as the "capture", which contains a collection of authorized transactions, to the card processor. Periodically, in a process referred to as "settlement", the capture information from numerous transactions is sorted by the card processor and payment instructions are transmitted to the issuing bank along with the acquiring bank. It will be appreciated that the term "institution" may be generally substituted herein for the term "bank", because financial institutions often comprise entities that are not technically banks. The funds are subsequently transferred by the issuing bank to the acquiring bank, with the statement of the cardholder being updated in accord with the transaction by the issuing bank. The acquiring bank posts net proceeds to the merchant account associated with the transaction. It will be appreciated that the net proceeds comprise the transaction amount less certain fees and charges retained by the card processor, the acquiring bank, and the issuing bank, these being referred to collectively as the "discount".

The use of a debit card typically results in the physical checking account of the cardholder at the issuing bank being debited by the amount of the transaction. The term "debit card" was derived from this payment characteristic of the card. As a result of the link with an underlying checking account, a debit card can only be issued to an individual with an established checking account that is considered a sufficiently low risk by the issuing institution. A debit card transaction typically involves five participants, comprising the cardholder, merchant, issuing institution, acquiring institution, and the acquiring processor. In order to execute a debit card purchase, the cardholder must have both a debit card issued by the issuing bank and a checking account at that issuing bank with a balance sufficient to cover the anticipated transaction. Furthermore, a merchant willing to accept the debit card as a device for enabling electronic payment must be found from which products and services are to be purchased.

In contrast to these aspects of a debit card payment instrument, the present invention is configured with an underlying trust account that is configured as a plurality of virtual accounts. Preferably each virtual account within the trust account is associated with a particular virtual account payment card, which may be referred to herein as a "VAP" card. It will be appreciated, however, that multiple VAP cards may be associated with a single virtual account. Furthermore, a VAP card can contain security features individualized for each of the parties to allow the execution of transactions from a single virtual account. The trust account has associated with it a repository of capital sufficient to disburse funds equivalent to the cumulative balances within the associated virtual accounts. The issuer of the VAP card may be the trustee of the trust account, or the trustee may be any large financial institution configured to manage the virtual accounts and communicate as necessary with the related parties. The payment card with associated virtual account is preferably either "issued to" the cardholder by an issuing institution, such as a bank, or "acquired by" the cardholder from a merchant. No physical account exists, such as for which checks may be written against, and the trustee of the trust account is a bank or other financial institution that is appointed to administer the funds within the trust account. Virtual account balances are thereby aggregated into the trust account for one or more issuing institutions from which transactions executed with the payment card may be directed. Information about active virtual accounts are contained as a record within a database which is maintained by the card issuer or trustee. The record for each virtual account is capable of retaining information about the current status of the virtual account, security information, and a history of transactions. It is preferred that the physical card associated with the present payment system and method be similar in appearance to a typical debit card, credit card, or charge card. The payment card of the present invention may be characterized by the association between at least one virtual account and the physical card which typically contains the virtual account number. It is preferred that the virtual account number be printed or embossed on the face of the card, and in some cases included as a field within the static memory, such as the magnetic strip, located on the VAP card.

Authentication within the present invention may be enhanced by the inclusion of security measures, which may be generally categorized as either device-centric measures and cardholder-centric measures. Device-centric measures may include various forms of indicia (such as holograms), computer chips, and the use of encrypted data. Cardholder-centric measures may include various forms of photographic cardholder image, cardholder signature, the incorporation of a PIN, or the inclusion of biometric identifiers within the system. It will be appreciated that each of these cardholder authentication measures is well known in the art. It will be further appreciated that in select applications, or at the behest of the cardholder, the security features may be omitted, wherein as a result the card becomes a bearer device that may be used as a form of electronic currency by the presenting party.

Added benefits may be derived within the payment card and system of the present invention by the retention of transaction specific data in a database relative to each virtual account contained in the trust account. Transaction information may be obtained for use by the card issuer, point of sale merchant, cardholder, or a designated third party. Cardholders will appreciate the ability to obtain a card transaction history from initial activation, or beginning balance, to any point in time thereafter. The transaction history may be output temporarily on a display device, or provided in a hardcopy format. Preferably, the cardholder could access the transaction history at point-of-sale devices and related devices, computer access such as over the Internet, and printed statements. The generation of historical transaction information can be made subject to the payment of fees wherein additional revenues may be produced.

The utilization of the virtual account payment method in accord with the present invention can provide additional economic incentives for the issuing institution. It will be appreciated that the costs associated with a checking account, such as establishing, closing, maintaining, and the processing costs for each physical check typically exceed the cost associated with a similar function related to a debit card. Therefore, it will be appreciated that debit card use is capable of generating increased revenue in relation to a checking account. It will be further appreciated that the present virtual account payment card reduces the costs borne by the issuing institution, whereby a low cost payment service may be provided which still retains economic benefits to the issuer that may exceed those associated with a debit card.

An object of the present invention is to provide a payment card which reduces the qualification burdens associated with debit and credit card instruments.

Another object of the present invention is to provide a payment card which is utilized in similar manner to a debit card and yet does not require being linked to a checking account.

Another object of the present invention is to provide a payment card which may be utilized within the existing payment card infrastructure in place of conventional debit cards, charge cards, and other types of payment cards.

Another object of the present invention is to provide a trust account, or similar form of account, which contains an aggregate of virtual accounts.

Another object of the present invention is to provide a virtual account associated with the payment card that may be decremented as purchases are executed, and incremented each time a deposit, refund, or adjustment is performed by the merchant to the cardholder through the virtual account payment card.

Another object of the present invention is to provide a monetary instrument that facilitates monetary transfers between individuals which may be geographically dispersed without resorting to a check-based transaction.

Another object of the present invention is to provide a payment card which limits the liability of the cardholder, such as to a maximum value of the card, while not subjecting additional cardholder financial accounts to loss due to fraud or criminal activity.

Another object of the present invention is to provide a payment card that is configured to minimize issuer costs, wherein the savings may be reflected to the cardholder as eliminated or reduced fees.

Another object of the present invention is to provide a payment card that may be utilized in lieu of having the party carry excessive amounts of cash.

Another object of the present invention is to provide a virtual account whose balance can be increased through the use of a form of funds transfer, such as electronic funds transfer, ATM, or telephone funds transfer.

Another object of the present invention is to provide a payment card that may be surrendered (redeemed) in exchange for currency in the amount of the remaining virtual account balance.

Another object of the present invention is to provide a payment card that may be configured as subject to an expiration date based on a defined period of time, for example, one year from the date of activation, or such other period as may be appropriate.

Another object of the present invention is to provide a payment card system and method whose associated database maintains a transaction history for transactions executed with the virtual account payment card.

Another object of the present invention is to provide a payment card that may be accepted as cash, wherein the merchant and acquiring institution do not incur a chargeback liability.

Another object of the present invention is to provide a payment card system to which charges may be applied to generate revenue for the issuer of the card.

Another object of the present invention is to provide a payment card that eliminates the possibility of cardholder charges associated with transactions posted against an account having non-sufficient funds (NSF charges).

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the method and system generally shown in FIG. 1 through FIG. 4. It will be appreciated that the system may vary as to configuration and as to details of the components, and that the method may vary as to the specific steps and sequence, without departing from the basic concepts as disclosed herein.

Figure 1:
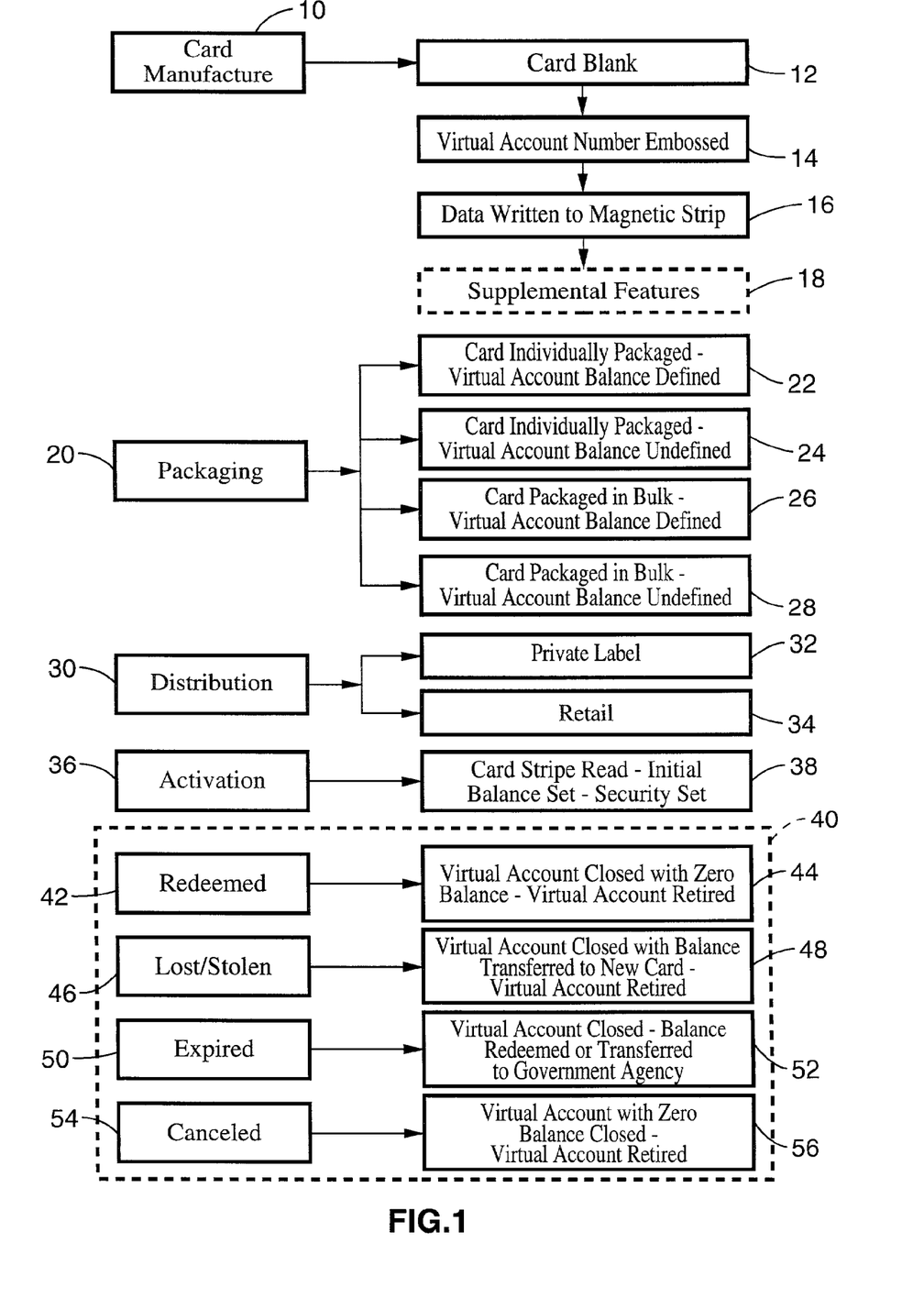
FIG. 1 is a block diagram outlining non-usage aspects of an electronic currency card based on a trust account according to an embodiment of the present invention.

FIG. 1 illustrates non-usage aspects of an embodiment of the present invention, such as manufacture, distribution, and redemption. The manufacture, at block 10, of a virtual account payment card is shown comprising the creation of a card blank shown at block 12 which is subsequently embossed with a virtual account number at block 14, and upon whose magnetic strip data is written at block 16. Preferably, magnetic strips are integrated on the back of the card and wherein data is encoded which includes the virtual account number of the card along with a sufficient number of additional fields to support proper cardholder verification and use. In addition, the virtual account payment card may be provisioned with supplemental fields and features at block 18, such as the incorporation of added security devices, for example a signature strip, cardholder photograph, hologram, electronic circuits, microcomputer chip, or other similar mechanisms which may be used individually or in combinations thereof. It will be appreciated that the trust account must be opened with a sufficient level of funds and the trust account database must also be configured to track the intended group of virtual accounts within the trust account prior to the activation of the virtual account payment cards.

A virtual account payment (VAP) card may be packaged at block 20 in a number of configurations. For example the VAP card may be packaged as a single card unit with a defined account balance at block 22, a single card with an undefined balance at block 24, cards in bulk packaging with each having a defined balance at block 26, or cards in bulk packaging with each having an un defined balance at block 28. Bulk packaging is typically utilized for shipping multiple cards to a point of card distribution, such as a retailer. It will be appreciated that cards with undefined balances are configured for accepting an initial account balance reflecting the balance contained in the associated virtual account.

VAP cards may be distributed as shown at block 30 through a variety of channels, including the use of "branded" cards with private labels at block 32 associated with a particular establishment. These private label cards preferably contain indicia and trade dress associated with the brand holder, such as an issuing bank, merchant, or organization. The cards may alternatively be configured as a retail product at block 34, wherein the graphics and text of the card may be directed toward increasing shelf appeal, or utilized to advertise popular products.

Card activation at block 36 is preferably performed conventionally, wherein the process is well known and commonly comprises authentication in a series of steps at block 38 which includes swiping the virtual account payment card through a card reader which reads data on the magnetic strip on the back of the card and preferably transmits related data to the database which is tracking the virtual accounts within the trust account. The virtual account is thereby assigned an initial balance, security level, and security parameters. Additionally, a photograph of the cardholder may be imprinted on the card to improve identification.

The handling of various card related events is summarized in block 40. The VAP card may be redeemed as shown at block 42 at any time, wherein the trustee releases a level of funds from the trust account commensurate with the remaining balance of the virtual account payment card. During redemption, the payment card, having an associated virtual account, is presented to a merchant or issuing bank, wherein the unused balance in the account is remitted to the cardholder through the trustee as a cash payment or credit. It is preferable that the card be surrendered at the time of redemption for payment of the unused balance to the cardholder, at block 44. Surrendered cards are preferably destroyed, however, these cards may be reprogrammed for subsequent use. The virtual account database of the issuing establishment, or trustee, would be updated on the status of the card, typically during the redemption process. The issuing bank thereupon can retire the associated virtual account number.

The procedure followed when a VAP card is lost or stolen at block 46, generally is dependent on the level of security incorporated into the card and the associated account. For example, the virtual account balance may be transferred to other accounts, such as another virtual account, or a new virtual account as shown in block 48. The virtual account associated with a reported stolen or lost VAP card being immediately retired.

The VAP card may be configured to have an expiration date, such as one based on a defined period of time, such as one year from the date of activation or renewal. Upon expiration of the virtual account of block 50, the virtual account is closed as depicted in block 52 and the virtual account balance held. Depending on the level of security, the held virtual account balance may be transferred to another virtual account, or redeemed, and the virtual account number retired. Generally, virtual account balances for expired payment cards which are neither transferred nor redeemed are subject to transfer to a government agency according to the prevailing escheatment statutes as provided by the Uniform Unclaimed Property Act of 1978.

A virtual account may be canceled as in block 54, such as for example if the corresponding card were to be damaged. A non-zero balance could be redeemed, and the damaged card with a zero balance would be destroyed with the associated virtual account number being retired as shown in block 56.

Figure 2:
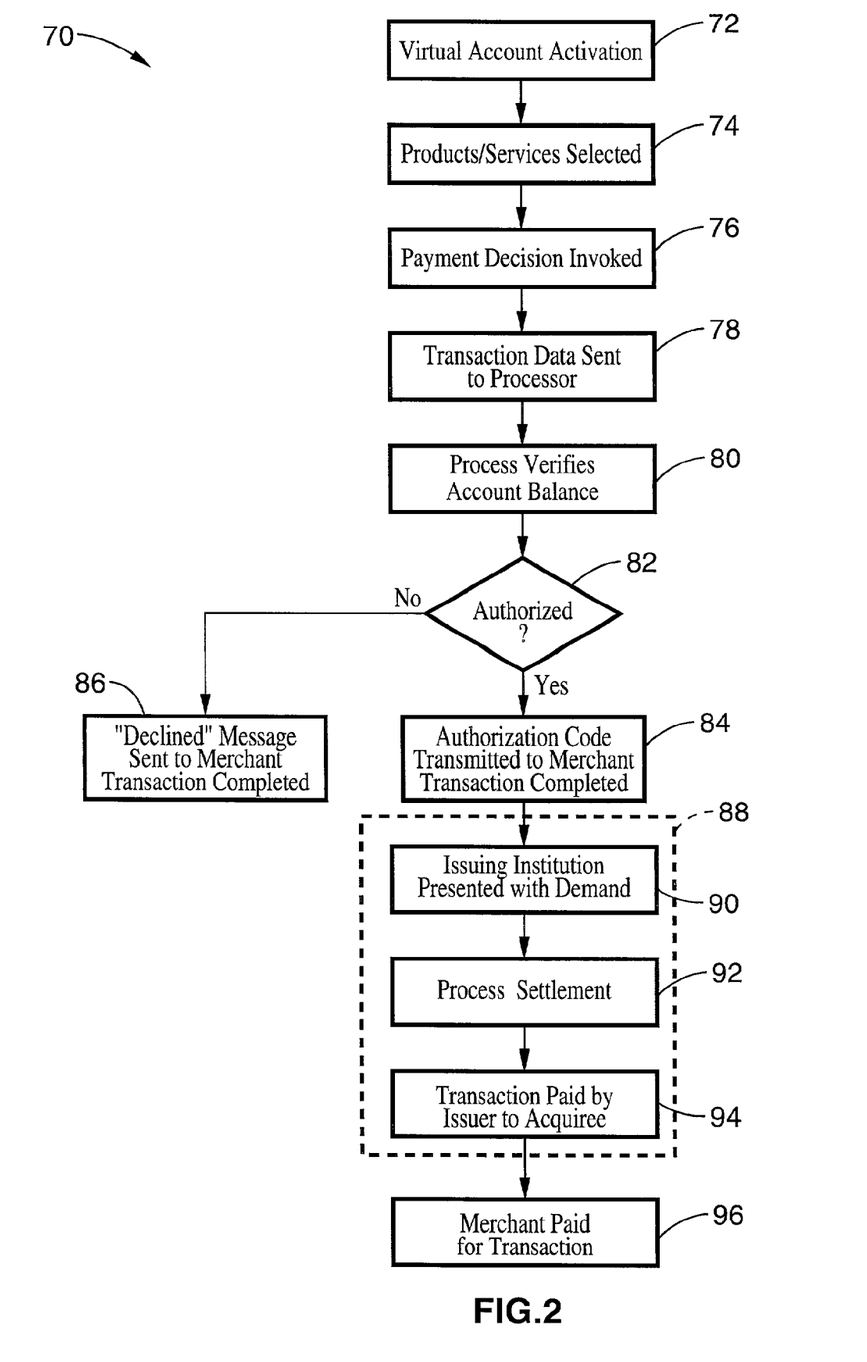
FIG. 2 is a flowchart of a transaction process for utilizing a virtual account payment card according to an embodiment of the present invention.

Referring now to FIG. 2 a process 70 is exemplified by which the virtual account payment card of the present invention may be used by a cardholder. To facilitate adoption of the VAP cards they have been developed for compatibility with the existing payment card infrastructure, in particular the transaction systems utilized for processing debit cards. Therefore, the steps depicted in FIG. 2 are similar to those required for processing a debit card. The virtual account is activated at block 72 as a database record within the database associated with a trust account, and the virtual account payment card is put into the possession of the cardholder. It will be appreciated that the virtual account may be activated with a fixed value prior to distribution to the cardholder, or the virtual account associated with the card may be initialized to any desired value at the time of activation and presentation to the cardholder. Once in possession of the card, the cardholder may select a product or service, as shown at block 74, which is offered by a merchant or vendor, electing to render payment at block 76 by means of the payment card. The virtual account payment card is typically submitted to the merchant for payment of the selected goods, or slid through a point of sale cardreader by either the cardholder, or merchant. The process of sliding the card through the POS system is commonly referred to as "swiping" the card. Alternatively, the virtual account information may be communicated to the merchant by other means, such as by telephone or the Internet. Security information may then be gathered in relation to the virtual account, such as a PIN number, or a biometric measurement as appropriate. The merchant, typically by means of a point of sale (POS) system generates information preferably comprising merchant identification, transaction date and time, description of products and services rendered, and total transaction amount. Transaction data is sent at block 78 from the merchant or vendor to the card processor which is capable of settling the transaction with the virtual account within the trust account database. The transaction data communicated to the card processor includes the virtual account numbers for the payment card, merchant identification, the date of the transaction, a brief description of the products and services rendered, and the transaction total. A portion of the information received by the card processor is utilized to verify 80 that the virtual account exists in good standing within the trust account database. The balance within the associated cardholder account is verified with the issuing establishment, such as a bank, at block 82 as a function of authorization. Payments remitted with the VAP card, are not authenticated against a checking account, or balance thereof, but rather are authenticated at block 82 against a generally anonymous virtual account that is tracked by the database of the trust account which may be administered by a bank, card issuer, or third party organization. Upon authentication, the transaction charge to the account is accepted at block 84 wherein the transaction is completed by the return of an authorization code from the issuing institution to the vendor. If the transaction is not authorized, for example the balance in the virtual account is insufficient to cover the proposed transaction expenditure, or the card has been reported lost or stolen, then the transaction from the merchant is rejected as shown in block 86 and transaction processing is completed with a corresponding "Declined" message being returned to the merchant. It should be appreciated that use of the present invention in lieu of a debit card or check has the further advantage of eliminating any need, or consideration, on the part of the cardholder to maintain an optional overdraft protection feature along with the requisite fees and interest associated therewith.

A transaction posted with the VAP card according to the present invention is settled in the settlement process within block 88 that ensues after transaction authorization. During the settlement process of block 88, the issuing bank is presented with a "demand" at block 90, referred to as the "capture", in the amount of the transaction. The demand is satisfied during processing of the settlement at block 92. An amount is paid by the issuing bank at block 94 from the trust account to thereby fulfill the transaction. It will be appreciated that the amounts transferred during settlement may be subject to certain fees, deductions, and deductions as agreed to by the parties to the settlement process. After the acquiring bank receives the payment for the transaction, it deposits the net transaction proceeds into the originating merchant account at block 96. Processing of the settlement between the issuer and acquiree are typically executed in a periodic "batch process", referred to as "off-line", in which a number of transactions are settled simultaneously at a point in time following the transmission of the initial transaction data.

To the cardholder, merchant, issuing institution, and acquiring institution, the above process has the identical net effect of a cash transaction facilitated by the card processor. The risk to any of the parties is similar to the risk associated with a cash transaction, albeit without the attendant risk of receiving counterfeit currency. The risks associated with the VAP card transaction being substantially mitigated by the preferable incorporation of the device-centric and cardholder-centric security measures, such as cardholder signature, cardholder photograph, PIN and biometric reference number protocols which, to varying degrees, limit the anonymity of the cardholder, but increase certainty that the party attempting the transaction is the bona fide cardholder.

It is preferable that the virtual account payment system and method of the present invention be configured as a cash account wherein the issuing institution, such as a bank, savings and loan, credit union, and so forth, is held solely responsible for the payment to the acquiring institution on behalf of the merchant. The use of a cash account configuration eliminates any risk to the merchant, and thereby may be accepted without concern for fraud or losses incurred from charge-backs.

The cardholder may be subject to issuance or use charges by the issuing institution and merchant. These charges may be accrued or prepaid based on periods of time, usage, or on a per transaction basis as described in the cardholder agreement. The charges provide revenue to the issuing bank or merchant while subjecting the cardholder to a limited and acceptable cost factor in relation to other payment methods such as debit cards, and credit cards.

An unsecured virtual account may be subject to a maximum balance as required by the processor, issuer, or in compliance with an agency of the federal or state government. It will be appreciated that the risk being assumed by the issuing bank, the acquiring institution, and the card processor in relation to the virtual account payment card should be lower than with either debit cards or charge cards. A wide latitude is provided to the issuing institution as to the extent of liability to be assumed by the cardholder. For example, a virtual account payment (VAP) card with adequate security features may subject the cardholder to a liability limit which is similar to that of a charge card, thereby providing a reduced cardholder liability in relation to a debit card. The VAP card may, however, be configured more as a cash card wherein the limited balance of the virtual account is subject to loss due to unreported theft or card loss. It should be appreciated, however, that the anticipated smaller virtual account size and refillable nature of the virtual account payment card limits cardholder risk.

The balance of the virtual account exists as an entry within the record for the virtual account within the database associated with the trust account, and may be incremented in a recharging process by performing a monetary transfer into the trust account. By way of example, funds may be transferred into the account at the issuing institution, point of sale system, telephone, electronically, or by various additional mechanisms by which monetary value may be transferred from one account to another. Commonly, cash transfers would be performed into the trust account from checking accounts, savings accounts, money market accounts, debit accounts, credit card accounts, lines of credit (such as home equity), loans, other cards, or by the direct remittance of currency.

It will be appreciated that individuals, typically those without checking accounts, may elect to receive their payroll checks in the form of a VAP card, or an associated electronic deposit to the underlying trust account of an existing payment card. Presently, individuals without checking accounts are unable to cash their checks with a bank and often must rely on cashing their paycheck with a check cashing service that deducts a percentage of the check in return for the service. Therefore, the use of the virtual account payment card in association with the present invention provides a low cost and low overhead method that these individuals may receive their compensation in a readily usable format.

Figure 3:
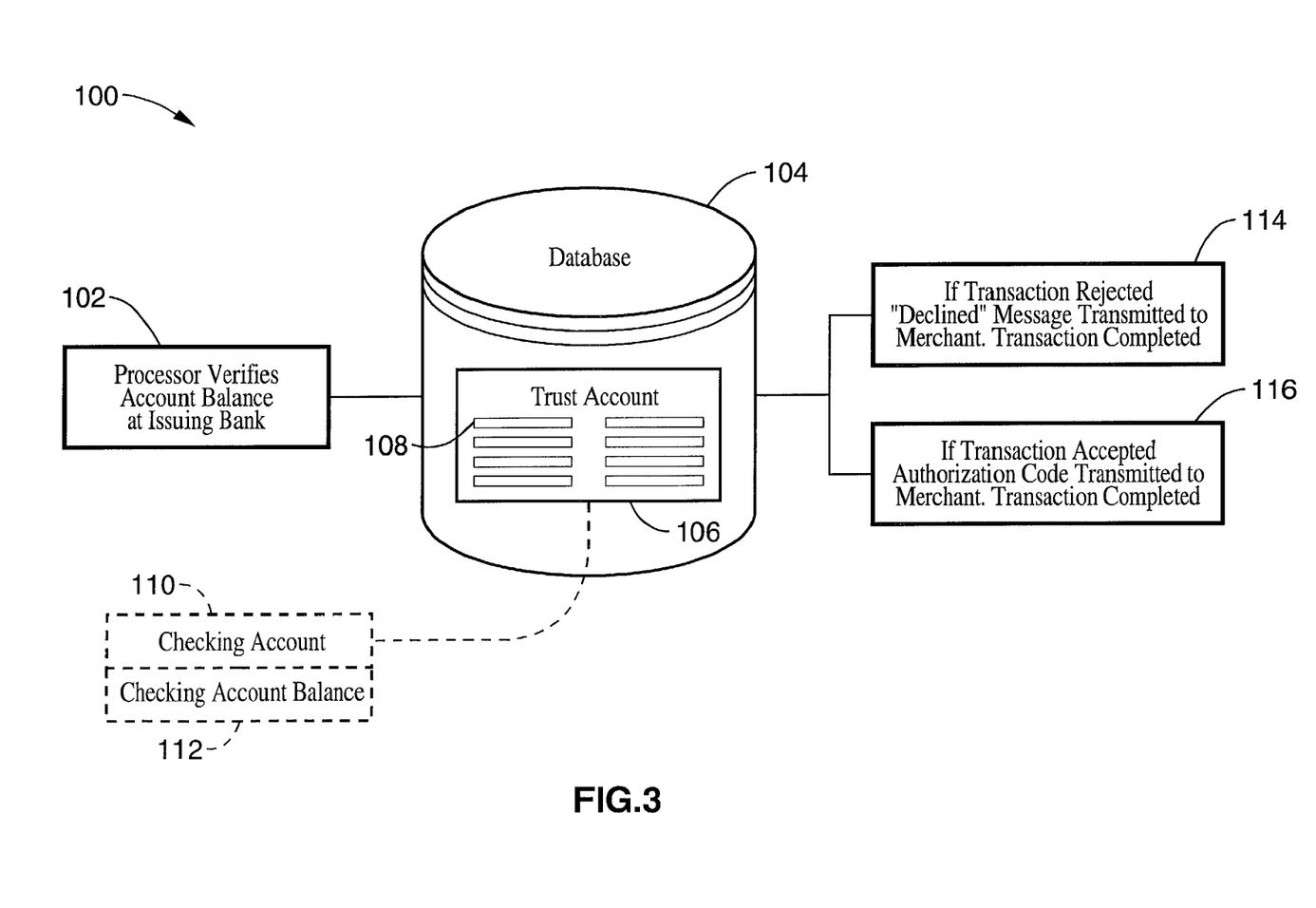
FIG. 3 is a data flow diagram for payment processing according to an embodiment of the present invention shown through the use of a trust account database.

FIG. 3 depicts processing 100 of a transaction by the issuer of a virtual account payment card. It will be appreciated that although the VAP card according to the present invention may be processed similarly to a conventional debit card, it is however, remitted against a different account entity and settled in a different manner than that of a debit card. The processor authorizes a transaction 102 in a similar manner for any type of payment card. The account entity of the present invention utilizes a transaction processing database 104 which maintains information about a trust account 106 and a plurality of virtual accounts 108 therein. It will be appreciated that the account is "virtual" as it is not a monetary account, but rather a data construct within the database associated with the trust account. The information in the trust account database is utilized by an application program configured for the processing of virtual account payment transactions. It should be appreciated that transaction processing in relation to a trust account 106 according to the present invention does not require the existence of a checking account. The trust account 106 may comprise any number of aggregated virtual account balances within a series of separately issued virtual accounts 108, each containing a virtual account balance. Transaction inquiries are therefore performed in relation to database of the trust account. Additional elements may be included within the transaction processing database of the issuer, for example, those that may be required by an issuing institution, the acquiring institution, the card processor, a card association, or combinations thereof.

The execution of transactions from trust account 106, in relation to a given virtual account 108 according to the present invention, provide a number of benefits over the use of a conventional checking account 110 with an associated checking account balance 112, both shown in phantom. It will be appreciated that conventional debit card database processing is based on a checking account structure 110 having a direct checking account balance 112. Debit card processing requires that the debit card be tied to the checking account of the cardholder. During authorization, the card processor inquires of the issuing bank whether or not the transaction is acceptable based on the checking account information of the cardholder. In processing the transaction, for example, the issuing bank accesses the database to verify the existence and balance within the checking account after which the reported balance of the checking account is decremented to prevent subsequent transaction inquiries from incorrectly authorizing transactions. The reported balance for transaction inquiry purposes, therefore, reflects the balance shown on the checking account, less the cumulative dollar amount of the pending transactions that will affect the checking account balance upon settlement. It should be appreciated that due to the speed of the electronic transactions, if the balance were not immediately debited for transaction inquiry purposes, then a series of transactions could be cleared through an account that lacks funds for covering said transactions. For example, consider a checking account with a balance of one thousand dollars, ($1000), upon which a series of six (6), five hundred dollar ($500) transactions are posted within a given day. If the transaction process did not deduct the reported inquiry balance after each transaction, and instead relied on the actual settled account balance for inquiries, then the entire series of transactions totaling three thousand dollars ($3000) could be paid out by the institution of the card issuer on behalf of a cardholder with a balance of only one thousand dollars ($1000).

The virtual account payment system of the present invention responds to a transaction authorization request by authenticating the transaction and comparing the prospective transaction amount against the virtual account balance as found in the virtual account record of the trust account database. The virtual account application thereby utilizes information within the database to either reject 114 or accept 116 the transaction as previously described. The amount of the virtual account available for further authorization requests is immediately adjusted according to the transaction.

Figure 4:
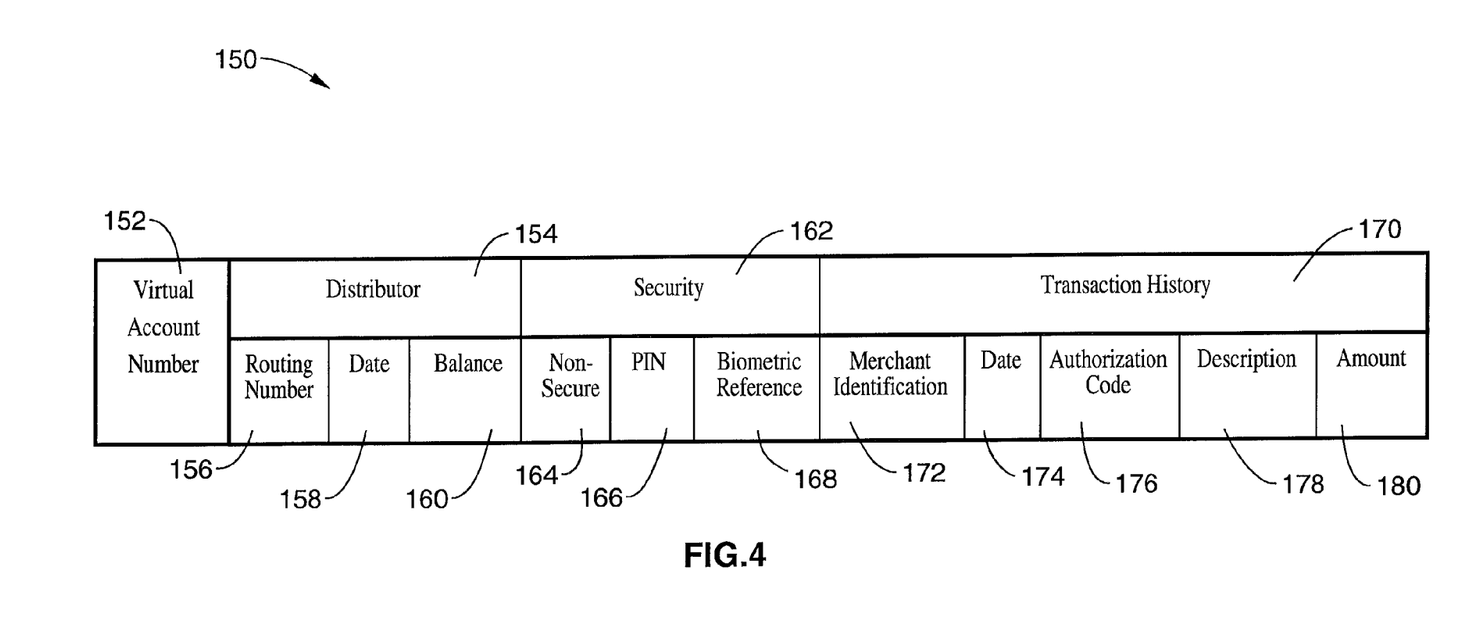
FIG. 4 is a data field diagram according to an embodiment of the present invention, shown with preferred transaction fields.

The trust account database of the present invention comprises numerous pieces of information which are exemplified in structure 150 of FIG. 4. The virtual account number 152 provides the identification for the elements of the account. The virtual account number is preferably embossed on the virtual account payment card and is encoded within the data of the magnetic stripe of the card. Information is preferably included about the card distributor 154, or issuer, such as a routing number 156, date account was activated 158, and a virtual account limit amount or initial balance 160. It will be appreciated that the VAP cards may be issued for a predefined face-value amount, for example $100, or be subject to an initial value set at the time of activation. Card values set at the time of activation may be configured with arbitrarily large card values, subject to applicable regulations. For example, a card may be obtained with a virtual account balance of ten thousand dollars ($10,000) to allow the cardholder to easily carry cash for use abroad, or for transfers to other parties. It is anticipated that security features will be incorporated within the card commensurate with the value of the card. The initial balance, or limit amount encoded within the magnetic stripe of the card, provide an additional safeguard against fraud. Various forms of monetary transfer may be utilized by the cardholder to make a "deposit" to the virtual account payment card. The deposit is performed through the transfer of value from another device, such as another payment card, a credit card, or a form of crediting transaction, such as a refund. It will be appreciated that the value of the card may be partially redeemed through the receipt of cash, such as at automatic teller machines (ATMs), wherein the virtual account balance would be accordingly decremented. Institutional fees may also be levied through the VAP card, such as transfer fees, ATM use fees, and account maintenance fees. In addition, the account balance or portions thereof may be transferred from one virtual account to another, such as in the case of transferring a balance to another individual, or the reimbursing of the cardholder for an expired, lost, stolen, or damaged card.

The ability to transfer a portion of a balance from one cardholder to another is a substantial benefit afforded VAP cardholders. Money transfers from non-institutional parties are conventionally executed with cash, or by check. Cash, of course is subject to loss and theft, and does not provide a mechanism for tracking the exchange. In the case of a check, it will be appreciated that both the payer and payee are generally required to have a checking account in order to fulfill the transaction. The present invention, however, allows individuals to electronically transfer money from their virtual account to the virtual account of another party. Preferably, the VAP card of the present invention does not restrict transfers being made from another VAP card, such as by requiring authorization by the party receiving the transfer. It will be appreciated that this ability to transfer funds eliminates the need of carrying large sums of cash or the exchange of cash for certified checks, and other such instruments, when money is to be sent to another party.

The database associated with the trust account may be augmented with security related information 162. Security information is exemplified with a "non-secure" field 164, a PIN number field 166, and a biometric reference field 168. The "non-secure" field 164 is capable of authorizing a non-secure card mode, wherein the VAP card may be submitted as a demand instrument in similar manner to a gift card. Typically, the use of a non-secure card would be appropriate only for use with virtual accounts carrying a small balance, because the balance is subject to withdrawal by anyone in physical possession of the card. Cards issued with a substantial balance are typically configured with one or more security features. Conventional personal identification numbers (PINs) provide a measure of security while requiring only a keypad for security authorization. Biometric recognition is becoming an increasingly attractive method of providing security authorization for a transaction, as the price of biometric equipment continues to drop in the face of increased exposure to charge card fraud. Typically, the use of biometric recognition involves a commercially available, or proprietary product, capable of measuring aspects of a unique biological characteristic, such as a fingerprint, or a retina scan. The characterization is then converted into a unique identifier which may be matched up with a value such as encoded within the biometric reference field 168 of the virtual account payment card. In use, a biometric scanning device is utilized to generate biometric characterization data, typically in the form of the biometric reference, prior to card activation wherein the characteristic value generated is encoded into the biometric reference field of the card 168. Thereafter, a similar biometric device can be utilized to authenticate that the person attempting to execute a transaction is the intended party. It will be appreciated that a number of biometric references may be incorporated into the security fields of the card, wherein the card would be activated for instance with a fingerprint, retina scan, and voiceprint such that the cardholder can authorize the transaction with point of sale systems utilizing any of biometric identifiers which are incorporated into the information of the card.

The database of the trust account preferably maintains a transaction history 170 within which information regarding each transaction applied to an associated virtual account is recorded. A single transaction history record is exemplified with a merchant identification field 172, transaction date field 174, authorization code field 176, transaction description 178, and a transaction amount field 180. The merchant identification field 172 contains an account number, or other identifier, for the merchant that is posting the transaction. It will be appreciated that merchants must first qualify for and be issued a merchant account by a card processor prior to the acceptance and processing of credit or payment card transactions. The merchant account number is typically utilized to identify the merchant to the card issuer, and provides a convenient identifier for the merchant. It will be appreciated that the merchant identification, or account number, is preferably translated into a text string which identifies the merchant to the cardholder when said cardholder views a transaction history. Parameters of the transaction are recorded within the database record for the virtual account and preferably include fields such as date 174, amount 180, description of items 178 are incorporated to track the purchases, while the authorization code 176 provides a tracking number for the transaction that may be used to access information about further details of the transaction. The transaction history, therefore, can provide information on every transaction associated with the VAP card from the time of activation, through each payment, deposit, adjustment, service fee, and refund. The output of the transaction record may be provided in a number of ways including the following:

(a) hardcopy at POS—a hardcopy, such as paper tape may be provided at the point of sale (POS) to augment the conventional receipt provided by the merchant. The hardcopy may be configured with any desired portion of the transaction history;

(b) hardcopy away from POS—a hardcopy could be available for printout by the cardholder, such as in the form of a paper tape printout, from a public venue or other user accessible terminal, such as at a financial institution, kiosk, ATM, or Internet session;

(c) temporary display—a transitory display, such as that of a computer screen after authentication, can provide a transaction report to the cardholder from the issuing institution, or intermediary;

(d) hardcopy from a computer session—the cardholder preferably can print out any information, as provided above, when interacting with the issuer or card processing database within a computer application; and (e) hardcopy printed statement—the cardholder may be provided with a traditional statement similar to that utilized for checking and similar accounts.

Accordingly the virtual account payment method and system of the present invention provides for the execution of cash transactions within the present charge card infrastructure without being linked to a checking account. Transactions are executed in relation to a form of trust account within which any number of virtual accounts may be agglomerated. It will be appreciated that the description of the embodiments of the present invention was provided by way of example, and that a number of variations can be implemented by one of ordinary skill in the art without creative faculty. In particular, it should be appreciated that the described embodiments of the present invention are directed at the current charge card transaction infrastructure, to simplify the adoption of the virtual account payment format, and that infrastructure changes may be anticipated after adoption to enhance the use of virtual account card formats as described within the present invention. Data fields described in the present invention were provided by way of example; it should be appreciated that various vendors and issuers may require more or less information, different formats, and variations as to process steps which can be readily derived from the teachings within the present invention.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for facilitating payment transactions, comprising:

generating a virtual account on behalf of a user, within a trust account configured for aggregating a plurality of virtual accounts under the control of a trustee appointed to administer the funds within the trust account;

said trust account configured with an associated repository of capital sufficient to disburse funds by said trustee equivalent to the cumulative balances within the associated virtual accounts;

issuing, to a user as a cardholder, a virtual account electronic payment card encoded with said virtual account number and linked to said trust account;

accessing said virtual account in response to presentation of payment transaction information associated with a virtual account payment card when executing a payment transaction; and immediately transferring any portion of a balance from the virtual account of said user, as said trustee releases a level of funds from the trust account in response to user directive, to render payment for executing said payment transaction without creating a chargeback liability.

2. A method as recited in claim 1, wherein said issuing includes the activation of said virtual account payment card.

3. A method as recited in claim 2, wherein a virtual account number is printed or embossed on said virtual account payment card; and the virtual account number is encoded on a magnetic stripe on the card.

4. A method as recited in claim 1, wherein said virtual account can be depleted through one or more transactions for which the virtual account payment card is used as the means of payment for a merchant.

5. A method as recited in claim 1, wherein said virtual account can be depleted through one or more transfers for which the virtual account payment card is utilized as a source of funds to facilitate a funds transfer to another virtual account.

6. A method as recited in claim 1, wherein redeeming said virtual account by the cardholder results in remuneration of the cardholder with a monetary value equivalent to a virtual account balance.

7. A method as recited in claim 1, wherein said virtual account can be recharged from time-to-time by transferring a monetary amount to an issuer or trustee for increasing the balance amount of the virtual account; and wherein the virtual account may be credited to increase the balance in response to merchant refunds and adjustments.

8. A method as recited in claim 1, wherein said virtual account payment card can be electronically scanned and authenticated through the existing payment card infrastructure; and wherein a transaction using said card is authorized and settled through the existing payment card infrastructure.

9. A method for performing monetary transactions with a virtual account payment card, comprising:

manufacturing a virtual account payment card containing a virtual account number printed or embossed on the card, and encoded magnetically within a magnetic stripe on the virtual account payment card;

generating a virtual account corresponding to the virtual account payment card, said virtual account maintained as a record within the database for a trust account, said virtual account record containing balance information indicative of the portion of funds received within the trust account which may be paid out from the trust account in response to a transaction with the virtual account payment card;

processing the virtual account payment card for a transaction the same as that used for other payment cards; and settling the transaction by the trustee, appointed to administer the funds within the trust account, from said trust account on behalf of the cardholder in response to the trustee releasing a level of funds from the trust account in response to cardholder directive;

wherein said transaction is settled immediately, without incurring chargeback liability, upon processing said transaction, by decrementing the existing balance of the virtual account in response to payments made with the virtual account payment card, and incrementing the existing virtual account balance in response to transfers made into the virtual account payment card.

10. A system for facilitating payment transactions, comprising:

means for generating a virtual account by a financial or other institution on behalf of a user within a database having a database record for the virtual account within a trust account which is responsive to a monetary remittance from the cardholder;

said trust account is controlled by a trustee appointed to administer the funds within the trust account in response to directives from the cardholder of said virtual account;

said database is configured to provide agglomeration of multiple virtual accounts to be associated with a single trust account;

an electronic payment card having a virtual account number associated with said virtual account, said virtual account number configured for being read while executing monetary payment and transfer transactions through said trustee;

means for issuing and activating said card;

means for initially establishing said virtual account when the card is issued and activated; and means for executing a payment transaction with said payment card against a virtual account without requiring the user to maintain a checking account associated with said payment card;

wherein said payment transaction comprises executing a payment through the existing payment card infrastructure, or transferring in response to user directive any portion of a balance from said virtual account to a virtual account of another cardholder; and said payment transaction decrementing the balance of said virtual account immediately upon authorizing said payment transaction, and without incurring a chargeback liability.

11. A system as recited in claim 10, wherein said virtual account is held anonymously by said user as cardholder.

12. A system as recited in claim 11, further comprising:

means for retaining a history of transactions executed from the associated virtual account.

13. A system as recited in claim 10, wherein said virtual account can be recharged by the cardholder to increase the account balance in response to depositing additional funds into the virtual account, transferring funds from another virtual account, or crediting the balance of the virtual account as the result of a merchant refund or adjustment.

14. A system as recited in claim 13, further comprising:

said recharging comprising the cardholder incrementing a balance for said virtual account within the trust account by direct remittance of currency, or by performing a monetary transfer from an account selected by the cardholder from the group of accounts consisting of: checking accounts, savings accounts, money market accounts, debit accounts, credit card accounts, lines of credit, and loans.

15. A system as recited in claim 10, further comprising at least one security feature selected from the group of security features consisting of cardholder signature, holographic indicia, cardholder photo, personal identification number, and biometric characterization data.

16. A system as recited in claim 10, wherein said virtual account can be depleted through one or more transactions for which the card is used as the means of payment to a merchant.

17. A system as recited in claim 10, wherein said virtual account can be recharged from time-to-time by depositing additional funds into the virtual account or crediting the balance of the virtual account as the result of a merchant refund or adjustment.

18. A system as recited in claim 10, wherein said card is electronically scanned and authenticated through the existing payment card infrastructure, and the transaction is then authorized and settled through the existing payment card infrastructure.

19. A system as recited in claim 10, further comprising means for generating additional virtual accounts, and means for aggregating all such virtual accounts for an issuing bank, or institution, into a single trust or similar account from which all transactions executed with the method are paid.

20. A method as recited in claim 1, wherein said virtual account is held anonymously by said user as cardholder.

21. A method as recited in claim 1, wherein said payment transaction comprises a payment made to a merchant, or a payment made in transferring funds into another virtual account.

22. A method as recited in claim 21, wherein said transferring of funds is performed without the need of receiving authorization from the cardholder associated with said virtual account to which the payment is transferred.

23. A method as recited in claim 1, wherein said virtual account is configured for being recharged to a higher fund level in response to performing a monetary transfer into said trust account.

24. A method as recited in claim 9, further comprising issuing and activating said virtual account payment card for said virtual account.

25. A method as recited in claim 9, wherein:
a virtual account number is printed or embossed on said virtual account payment card; and
the virtual account number is encoded on a magnetic stripe on the card.

26. A method as recited in claim 9, wherein said virtual account can be depleted through one or more transactions for which the virtual account payment card is used as the source of payment for executing transactions with a merchant.

27. A method as recited in claim 9, wherein said virtual account can be depleted through one or more transfers for which the virtual account payment card is utilized as a source of funds to facilitate a funds transfer to another virtual account.

28. A method as recited in claim 9, wherein redeeming said virtual account by the cardholder results in remuneration of the cardholder with a monetary value equivalent to a virtual account balance.

29. A method as recited in claim 9,
wherein said virtual account can be recharged from time-to-time by transferring a monetary amount to an issuer or trustee for increasing the balance amount of the virtual account; and
wherein the virtual account may be credited to increase the balance in response to merchant refunds and adjustments.

30. A method as recited in claim 9,
wherein said virtual account payment card can be electronically scanned and authenticated through the existing payment card infrastructure; and
wherein a transaction using said card is authorized and settled through the existing payment card infrastructure.

* * * * *